United States Patent [19]
Wiesenfeld et al.

[11] Patent Number: 5,935,488
[45] Date of Patent: Aug. 10, 1999

[54] DEICING AND ANTI-ICING CONCENTRATED COMPOSITION FOR AIRCRAFT

[75] Inventors: Arnold Wiesenfeld, Mahwah; Alex Meyers, Montvale; Robert Leicht, Paramus, all of N.J.

[73] Assignee: Octagon Process Inc., Edgewater, N.J.

[21] Appl. No.: 09/133,504

[22] Filed: Aug. 12, 1998

Related U.S. Application Data

[63] Continuation-in-part of application No. 08/837,999, Apr. 16, 1997, Pat. No. 5,817,252.

[51] Int. Cl.$^6$ ........................................ C09K 3/18
[52] U.S. Cl. ................................. 252/70; 106/13
[58] Field of Search ................... 252/70; 106/13

[56] References Cited

U.S. PATENT DOCUMENTS

| | | | |
|---|---|---|---|
| 4,358,389 | 11/1982 | König-Lumer et al. | 106/13 |
| 4,698,172 | 10/1987 | Tye et al. | 106/13 |
| 4,744,913 | 5/1988 | Salvador et al. | 106/13 |
| 4,954,279 | 9/1990 | Ma et al. | 106/13 |
| 5,118,435 | 6/1992 | Nieh | 106/13 |
| 5,268,117 | 12/1993 | Fusiak et al. | 252/70 |
| 5,273,673 | 12/1993 | Ashrawi et al. | 106/13 |
| 5,334,323 | 8/1994 | Schrimpf et al. | 252/70 |
| 5,389,276 | 2/1995 | Coffey et al. | 106/13 |
| 5,461,100 | 10/1995 | Jenkins et al. | 106/13 |

FOREIGN PATENT DOCUMENTS

| | | | |
|---|---|---|---|
| 555002 | 8/1993 | European Pat. Off. | 106/13 |

OTHER PUBLICATIONS

Chemical Abstract No. 109:24348 which is an abstract of European Patent Specification No. 257,720 (Mar. 1988).

*Primary Examiner*—Anthony Green
*Attorney, Agent, or Firm*—Ezra Sutton

[57] ABSTRACT

A concentrated deicing and anti-icing composition which is diluted and is primarily used for aircraft surfaces being a mixture including a deicing and anti-icing base compound being propylene glycol and/or ethylene glycol in the overall range of 78.0% to 95.0% by weight of the deicing and anti-icing composition. A diluent is included in the form of water for use as a carrier fluid of the glycol in the overall range of 5.0% to 22.0% by weight of the deicing and anti-icing composition. A first nonionic surfactant agent is included having an HLB in the overall range of 4 to 17; and used in a weight proportion where the overall range is 1 ppm to 0.5% by weight of the deicing and anti-icing composition. A second nonionic surfactant agent is included having an HLB in the overall range of 5 to 18; and used in a weight proportion where the overall range is 1 ppm to 0.5% by weight of the deicing and anti-icing composition. The second nonionic surfactant agent has an HLB at least two (2) units higher than the first nonionic surfactant agent. An emulsifier is included in the form of a polycarboxylate compound being in the overall range of 1 ppm to 0.5% by weight of the deicing and anti-icing composition. A pH control agent maintains the pH of the deicing and anti-icing composition between a 6 and 10 value; and used in a weight proportion where the overall range is 1 ppm to 1.0% by weight of the deicing and anti-icing composition.

55 Claims, 4 Drawing Sheets

DEICING AND ANTI-ICING CONCENTRATED COMPOSITION FOR AIRCRAFT

RELATED APPLICATION

This application is a continuation-in-part of application Ser. No. 08/837,999, filed on Apr. 16, 1997 now U.S. Pat. No. 5,817,252.

FIELD OF THE INVENTION

The present invention relates to a new and improved concentrated deicing and anti-icing fluid composition primarily for use on aircraft surfaces. More particularly the deicing/anti-icing composition is a single phase fluid having a low diffusion rate to retard the onset and progression of freezing of water on the treated surfaces during periods of precipitation.

BACKGROUND OF THE INVENTION

Deicing fluids are used to remove frozen, or partially frozen, deposits of ice and snow from surfaces which are required to be free from such contamination. Anti-icing fluids prevent, for a limited time, the refreezing of water on treated surfaces. Both types of fluid are well known in the art. It is necessary for ongoing airport operations, during periods of freezing precipitation, to apply deicing/anti-icing fluids. The longer the time interval from when the anti-icing fluid is applied to a freshly decontaminated surface, until the onset of re-freezing on that surface, the greater the advantage to the user. The standard method of assessing this time delay is the Water Spray Endurance Test (WSET), which is fully described in an appendix to the SAE/AMS 1428.

Prior art anti-icing fluids rely heavily upon thickening polymers to achieve performance, and have apparent viscosities in the range 15,000 to 55,000 mPas. when measured at 20° C. This inherent thickness lays down a thick layer. It is this volume thickness of glycol which is the greatest contributor to retarding the onset of re-freezing. The present minimum standard for type II fluids is 30 minutes and a type I is 3 minutes.

DESCRIPTION OF THE PRIOR ART

Deicing and anti-icing concentrate fluid compositions for aircraft surfaces have been disclosed in the prior art. For example, U.S. Pat. No. 4,954,279 to Ma et al discloses an aircraft deicing and anti-icing concentrate composition. The composition includes a microemulsion of oil in a water/glycol solution having thickening agents, emulsifiers being substantially water-insoluble, and alkanolamines to provide a composition having effective deicing and anti-icing properties. This prior art patent does not disclose the chemical composition nor the chemical mechanism for operation of the deicer and anti-icer fluid of the present invention.

U.S. Pat. No. 5,118,435 to Nieh discloses anti-icing compositions containing thickener blends having a polyacrylic acid and a copolymer of acrylic acid and a hydrophobic vinyl monomer for use on aircraft wing surfaces. These compositions retain a high viscosity, even when diluted with water and exhibit a highly pseudo plastic rheology indicating desirable flow off characteristics. This prior art patent does not disclose the chemical composition nor the chemical mechanism for operation of the deicer and anti-icer fluid of the present invention.

U.S. Pat. No. 5,268,117 to Fusiak et al discloses a non-flammable, pseudo-plastic deicing composition for use on exposed surfaces of aircraft. The composition includes a glycol based anti-icing fluid containing a 0.2 to 1.0% crosslinked poly (N-vinylpyrrolidone) being used as the major polymer additive in the range of 0.05% to 5% by weight; and an aqueous $C_2$ to $C_3$ alkylene glycol in the range of 95% to 99.5% by weight. This prior art patent does not disclose the chemical composition nor the chemical mechanism for operation of the deicer and anti-icer fluid of the present invention.

U.S. Pat. No. 5,273,673 to Ashrawi et al discloses anti-icing compositions having an alkylphenol ethoxylate nonionic surfactant and an alkylaryl sulfonate hydrotrope therein being used on aircraft wing surfaces. In addition, the anti-icing compositions use thickeners containing a blend of a polyacrylic acid and a copolymer of polyacrylic acid with a vinyl monomer where the copolymer acts as a thickener modifier. This prior art patent does not disclose the chemical composition nor the chemical mechanism for operation of the deicer and anti-icer fluid of the present invention.

U.S. Pat. No. 5,334,323 to Schrimpf et al discloses deicing or anti-icing fluids for aircrafts. These fluid compositions include glycols, a crosslinked polyacrylic acid, a nonionic surfactant based on alkoxylated $C_{10}$ to $C_{20}$ alcohols, corrosion inhibitors, a mixture of NaOH and KOH, an antioxidant and water. This prior art patent does not disclose the chemical composition nor the chemical mechanism for operation of the deicer and anti-icer fluid of the present invention.

U.S. Pat. No. 5,461,100 to Jenkins et al discloses aircraft deicing/anti-icing fluid including a glycol-based aqueous solution thickened with a macromonomer containing polymer in an amount of less than about 5% by weight. This prior art patent does not disclose the chemical composition nor the chemical mechanism for operation of the deicer and anti-icer fluid of the present invention.

None of the aforementioned prior art patents teach or disclose a chemical composition having a distinct chemical mechanism for retarding the onset of re-freezing of water on the surface of the protective film of anti-icing fluid as the present invention does.

Accordingly it is an object of the present invention to teach and define an improved deicing and anti-icing concentrate fluid composition having a chemical mechanism to control the diffusion of water and thereby retard the onset of re-freezing of water on the surface of an applied film of anti-icing fluid.

Another object of the present invention is to provide a chemical composition having a distinct chemical mechanism for retarding the onset of re-freezing of water on the surface of the protective film of anti-icing fluid when applied to aircraft surfaces.

Another object of the present invention is to provide a fluid composition which does not solely rely upon the use of a thickening polymer, or polymers, to achieve its objective.

SUMMARY OF THE INVENTION

It should be understood that the fluids described in the present invention and those illustrated by example herein are considered concentrated deicing/anti-icing fluids and must be used by dilution with water, the dilution being dependent upon the operating conditions which need to be satisfied.

In accordance with the present invention there is provided a deicing and anti-icing concentrate fluid composition, primarily for use on aircraft surfaces, being a compound containing propylene glycol in the overall range of 78.0% to 95.0% by weight of the fluid composition, with a preferred range of 88.0% to 88.5% by weight of the fluid composition. A further embodiment is a compound containing ethylene glycol in the overall range of 78.0% to 95.0% by weight of the fluid composition, with a preferred range of 88.0% to 88.5% by weight of the fluid composition. Another embodiment is a compound containing an infinitely variable combination of propylene and ethylene glycols such that the combined glycol content is in the range of 78.0% to 95.0% by weight of the fluid composition, with a preferred range of 88.0% to 88.5% by weight of the fluid composition.

The remainder of the primary glycol based composition includes water in the overall range of 5.0% to 22.0% by weight of the fluid composition with a preferred range of 10.0% to 12.0% by weight of the fluid composition.

The fluid composition also includes a first nonionic surface active agent having an HLB in the overall range of 4 to 17 with a preferred HLB range of 4 to 9; and used in a weight proportion where the overall range is 1 ppm to 0.5% by weight of the fluid composition.

The fluid composition also includes a second nonionic surface active agent having an HLB in the overall range of 5 to 18 with a preferred HLB range of 13 to 18; and used in a weight proportion where the overall range is 1 ppm to 0.5% by weight of the deicing and anti-icing concentrate composition. The second nonionic surfactant agent has an HLB at least two (2) units higher than the first nonionic surfactant agent.

The fluid composition also includes an emulsifier in the form of a polycarboxylate compound being in the overall range of 1 ppm to 0.5% by weight of the fluid composition.

The fluid composition also includes a pH control agent for adjusting the pH of the deicing and anti-icing concentrate composition between a 6 and 10 value; and used in a weight proportion where the overall range is 1 ppm to 1.0% by weight of the deicing and anti-icing concentrate composition.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
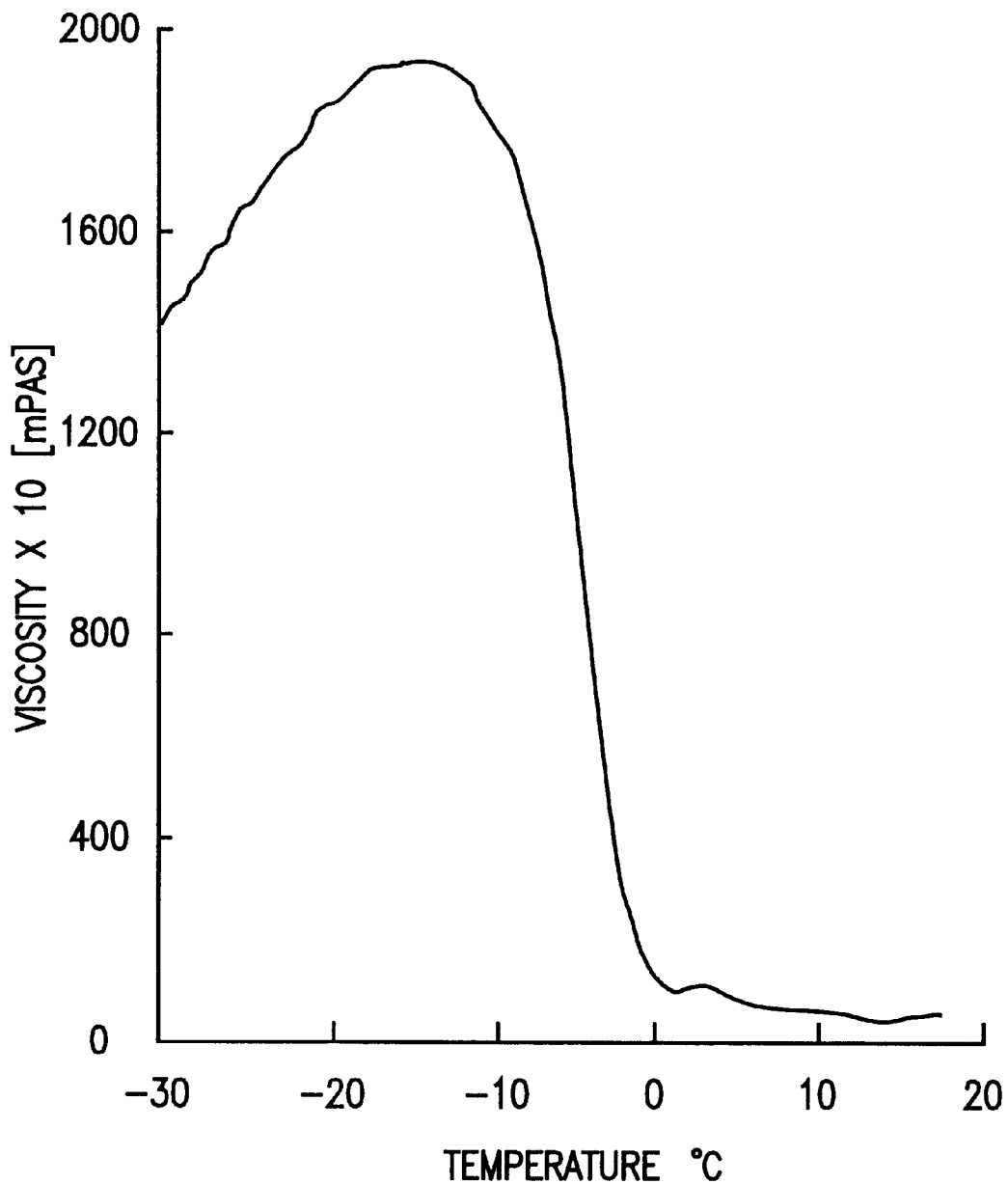
FIG. 1 is a graph showing viscosity versus temperature for the diluted deicer and anti-icer composition having zero percent content of the second nonionic surfactant therein.

The preferred embodiment of the composition is propylene glycol by itself as the freeze point depressant in the base compound; and the alternate embodiments include the use of ethylene glycol by itself as the base of the compound in place of the propylene glycol; or a combination of ethylene glycol and propylene glycol as the combined base of the compound in place of the propylene glycol of the preferred embodiment. In the present invention, the preferred and alternate embodiments of the deicing and anti-icing concentrate fluid compositions are as follows:

| Component Compound | % Component Weight |
|---|---|
| I. Deicing/anti-icing base compound such as propylene glycol, ethylene glycol or a combination of propylene glycol and ethylene glycol. | 78% to 95% |
| II. Water. | 5% to 22% |
| III. Surface active agents or surfactants in the form of: | |
| A. A nonionic surfactant having an HLB in the overall range of 4 to 17 with a preferred range of 4 to 9 which include compounds such as the alkoxylated derivatives of alcohols, alkylphenols, amines and fatty acids; propylene oxide and ethylene oxide block polymers; and the equivalents thereof. | 1 ppm to 0.5% |
| B. A nonionic surfactant having an HLB in the overall range of 5 to 18 with a preferred range of 13 to 18 which include compounds such as the alkoxylated derivatives of alcohols, alkylphenols, amines and fatty acids; propylene oxide and ethylene oxide block polymers; and the equivalents thereof. | 1 ppm to 0.5% | a) Alkoxylated (ethoxylated and/or propoxylated) alcohol derivatives.
Examples of these compounds are as follows:
i) lauryl alcohol + 4 moles of ethylene oxide
ii) oleyl alcohol + 12 moles of ethylene oxide
iii) castor oil + 5 moles of ethylene oxide
iv) sorbitan monolaurate + 4 moles of ethylene oxide
v) stearyl alcohol + 2 moles of propylene oxide
vi) glyceryl laurate + 23 moles of ethylene oxide
General formula for an alcohol ethoxylate is:
$C_nH_{(2n+1)}O—(C_2H_4O)_x—H$
where $n = \geq 1$
$x$ = moles of EO $\geq 1$
also $C_nH_{(2n-1)}O$ can be substituted in the above formula.

b) Alkoxylated (ethoxylated and/or propoxylated) alkylphenol derivatives.
Examples of these compounds are as follows:
i) Nonylphenol + 10 moles of ethylene oxide
ii) Octylphenol + 6 moles of ethylene oxide
iii) Dodecylphenol + 10 moles of ethylene oxide
iv) Dinonylphenol + 8 moles of ethylene oxide
v) Octylphenol + 4 moles of propylene oxide
General formula for an alkylphenol ethoxylate is:
$R^1R^2C_6H_3—O—(CH_2CH_2O)_x—H$
where $R^1$ is $C_nH_{(2n+1)}$    where $n = \geq 1$
$R^2$ is $C_nH_{(2n+1)}$ or H    $x$ = moles of EO $\geq 1$ c) Alkoxylated (ethoxylated and/or propoxylated) amine derivatives.
Examples of these compounds are as follows:
i) Stearyl amine + 2 moles of ethylene oxide
ii) Tallow amine + 10 moles of ethylene oxide
iii) Soya amine + 4 moles of ethylene oxide
iv) Cocomonoethanol amine + 5 moles of ethylene oxide
v) Cocoamine + 3 moles of propylene oxide
vi) Laurylamine + 5 moles of ethylene oxide
General formula for an amine ethoxylate is:
$R^1N—(C_2H_4O)_x—H$
   $(C_2H_4O)_y—H$
where $R^1 = C_nH_{(2n+1)}$ or $C_nH_{(2n-1)}$
$x$ = moles of EO $\geq 1$
$y$ = moles of EO $\geq 1$ d) Alkoxylated (ethoxylated and/or propoxylated) fatty acid derivatives. Examples of these compounds are as follows:
i) Stearic acid + 40 moles of ethylene oxide
ii) Oleic acid + 10 moles of ethylene oxide
iii) Tall oil fatty acids + 7 moles of ethylene oxide
iv) Coco fatty acid + 4 moles of ethylene oxide
v) Lauric acid + 12 moles of propylene oxide
vi) Hydroxystearic acid + 2 moles of ethylene oxide -continued

| Component Compound | % Component Weight |
|---|---|
| General formula for a fatty acid ethoxylate is: | |
| $$R^1-\overset{O}{\underset{\|}{C}}-O-(C_2H_4O)_x-H$$ | |
| where $R^1 = C_nH_{(2n+1)}$ or $C_nH_{(2n-1)}$<br>n = 5 to 17<br>x = $\geq$ 1 moles of EO | |
| e) Propylene oxide and ethylene oxide block polymers. Examples of these compounds are as follows:<br>i) Antarox PGP ™<br>ii) Macol 22 ™<br>iii) Nonionic R Series ™<br>iv) Pluronic P ™<br>v) Tetronil R ™ | |
| IV. An emulsifier compound such as a polycarboxylate. | 1 ppm to 0.5% |
| V. pH control agents such as potassium hydroxide, sodium hydroxide, dipotassium phosphate, organic amine bases, tolytriazole, benzotriazole and the equivalents thereof. | 1 ppm to 1.0% |

The deicing and anti-icing concentrate composition for aircraft of the present invention includes a base compound such as propylene glycol and/or ethylene glycol as the primary deicer/anti-icer component for depressing the freezing point of water. The propylene glycol component is in the overall range of 78.0% to 95.0% by weight of the deicing/anti-icing composition with a preferred range of 88.0% to 88.5% by weight of the deicing/anti-icing composition. The ethylene glycol component is in the overall range of 78% to 95% by weight of the deicing/anti-icing composition with a preferred range of 88.0% to 88.5% by weight of the deicing/anti-icing composition. The combination of propylene glycol and ethylene glycol is in the overall range of 78% to 95% by weight of the deicing and anti-icing concentrate composition with a preferred range of 88.0% to 88.5% by weight of the deicing and anti-icing concentrate composition.

The other primary ingredient of the compound is water which is the carrier fluid for the propylene glycol or ethylene glycol or the blend of ethylene and propylene glycol. The amount of water used in the composition having propylene glycol only is in the overall range of 5.0% to 22.0% by weight of the composition, with a preferred range of 10.0% to 12.0% by weight of the composition. Alternatively, the water used in the composition having ethylene glycol only is in the overall range of 5% to 22% by weight of the composition, with a preferred range of 10.0% to 12.0% by weight of the composition. The water used in the composition having both ethylene glycol and propylene glycol therein, has the diluent water in an overall range of 5.0% to 22.0% by weight of the composition, with a preferred range of 10.0% to 12.0% by weight of the composition.

The surfactant used in the present invention includes a mixture of two types of nonionic surfactants having an HLB range between 4 and 18. HLB is defined as the hydrophilic lipophilic balance (HLB) such that the higher the HLB the greater the water compatibility. The first nonionic surfactant has an HLB in the overall range of 4 to 17 with a preferred range of 4 to 9 and is used in the following weight proportion where the overall range is 1 ppm to 0.5% by weight of the deicing/anti-icing composition. The second nonionic surfactant has an HLB in the overall range of 5 to 18 with a preferred range of 13 to 18; and is used in the following weight proportion where the overall range is 1 ppm to 0.5% by weight of the deicing/anti-icing composition. The second nonionic surfactant has an HLB at least 2 units different (higher) than the first nonionic surfactant.

Both types of nonionic surfactants include compounds such as the alkoxylated (ethoxylated and/or propoxylated) derivatives of alcohols, alkylphenols, amines, and fatty acids; propylene oxide and ethylene oxide block polymers; and the equivalents thereof. Examples of alkoxylated derivatives have been listed in the composition table above.

The emulsifier is in the form of a polycarboxylate compound. The polycarboxylate emulsifier has a molecular weight between 500,000 to 3,000,000. The amount of polycarboxylate emulsifier used in the composition of the present invention is in the overall range of 1 ppm to 0.5% by weight of the deicing/anti-icing composition.

The present invention uses a pH control agent to adjust and maintain the pH of the deicing and anti-icing concentrate composition between a value of 6 and 10. pH control agents include such compounds as potassium hydroxide, sodium hydroxide, dipotassium phosphate, organic amine bases, tolytriazole, benzotriazole and equivalents thereof. The amount of pH control agents used in the composition of the present invention is in the overall range of 1 ppm to 1.0% by weight of the deicing and anti-icing concentrate composition.

The deicing and anti-icing concentrate composition may be either alkaline or acidic depending upon the total chemical composition of all additives and the required compounds included in the deicer and anti-icer system. If alkaline the pH value will be in the range of 7.01 to 10; and if acidic the pH value will be in the range of 6.00 to 6.99.

The fluid composition of the preferred embodiment may also contain one or more component compounds having properties of anti-corrosion, anti-foam, non-flammability, water hardness control and a colorant dye within the liquid composition.

Anti-corrosion compounds may be selected from the group consisting of tolytriazole, benzotriazole, alkoxylated butynediol, thiourea, propargyl alcohol, sodium nitrate, butyne-1,4 diol and equivalents and combinations thereof being in the range of 1 ppm to 1.0% by weight of the deicer/anti-icer composition.

Anti-foam agents are silicone oil-based defoamers. Examples of silicone defoamers are SAG1000™, Siltech E-2202™, AF-9020™, DC 1520 Silicone anti-foam™, Foam Ban XQC 136B™ and equivalents thereof being in the range of 1 ppm to 0.5% by weight of the deicer/anti-icer composition.

Non-flammability agents may be selected from the group consisting of tolytriazole or benzotriazole being in the range of 1 ppm to 1.0% by weight of the deicer/anti-icer composition. The non-flammability agent is used to further depress the ignition or flash point of the deicing and anti-icing concentrate composition.

Water hardness control agents may be selected from the group consisting of sodium ethylenediaminetetraacetate, sodium hydroxyethylethylenediaminetriacetate, tolytriazole, benzotriazole, sodium polyphosphates, sodium nitrilotriacetate, sodium pyrophosphate, sodium citrate, sodium gluconate and equivalents thereof being in the range of 1 ppm to 1.0% by weight of the deicer/anti-icer composition.

Color dye identification components are a water-soluble dye that includes a Type I: red-orange, a Type II: colorless to straw and a Type IV: green being in the range of 10 ppb to 0.1% by weight of the deicer/anti-icer composition.

Based on observation, this combination of ingredients in the weight proportions used apparently controls the diffusion rate of water into and throughout a thin film of the composition mixture, thereby retarding the onset and progression of freezing. In particular, the combination of the nonionic surfactants and polycarboxylic surfactant used in the composition act to control the diffusion rate of water into and throughout the deicing and anti-icing system of the present invention.

The length of time it takes for freezing to occur on a particular surface during precipitous conditions is known as the WSET time, or commonly referred to as the "Holdover" time. The Water Spray Endurance Test (WSET), as described in Appendix A of the Aerospace Material Specification (AMS) 1428 latest version, is an internationally recognized method to monitor and test for this time interval between application of an anti-icing product, and the onset of freezing condition.

Based upon experimental observation any mixture of propylene glycol and/or ethylene glycol and water absorbs and diffuses the added moisture. When the glycol is diluted enough, freezing occurs. When diffusion is rapid, freezing occurs quickly. When diffusion is severely retarded, non-diffused water collects on the surface and freezes. When the nonionic surfactants and emulsifier are added to the glycol and water, they slow down the diffusing rate (movement) of the water into and throughout the fluid, and the time it takes until the onset of re-freezing occurs is substantially increased. If the material is thickened, as described in prior art, the time for freezing (WSET) is extended by virtue of increased glycol volume. If the diffusion rate is controlled, as in the present invention, then a thin film of the present invention exhibits a greatly extended WSET time.

OPERATION OF THE PRESENT INVENTION

Procedure for compounding 1 kg of each of the examples are as follows: In compounding Example 1 the technician uses a 1500 ml beaker equipped with a mechanical stirrer, and adds 111.7 grams of water, and with the stirrer running, adds 2.02 grams of the polycarboxylate emulsifier and then stirs for 2 hours. To the beaker is then added 882 grams of propylene glycol and further mixed for 5 minutes. As shown in Table 1A, the percentage of propylene glycol by weight for Example 1 is 88.2%. Next, to the beaker is added 1.91 grams of octylphenol 3 mole ethoxylate and mixed 5 minutes. Then 0.33 grams of nonylphenol 12 mole ethoxylate is added and incorporated into the 1500 ml beaker and further mixed for 5 minutes. The composition mixture is then adjusted to a pH (neat) value between 7 to 9 with potassium hydroxide. Examples 2 through 9 were prepared by diluting example 1 with tap water using the dilution ratios indicated in Tables 1A and 1B.

In compounding Example 10 the technician uses a 1500 ml beaker equipped with a mechanical stirrer, and adds 111.7 grams of water, and with the stirrer running, adds 2.02 grams of the polycarboxylate emulsifier and then stirs for two hours. To the beaker is added 0.33 grams of nonylphenol 12 mole ethoxylate and mixed for 5 minutes. The technician then adds 882 grams of ethylene glycol to the beaker and further mixes for 5 minutes. As shown in Table 2, the percentage of ethylene glycol by weight is 88.2%. Next, to the beaker is added 1.91 grams of octylphenol 3 mole ethoxylate and further mixed for 5 minutes. The composition mixture is then adjusted to a pH (neat) between 7 and 9 with potassium hydroxide. Examples 11 to 13 were prepared by diluting Example 10 with tap water.

In compounding Example 14 the technician uses a 1500 ml beaker equipped with a mechanical stirrer, and adds 111.7 grams of water; and with the stirrer running, adds 2.02 grams of the polycarboxylate emulsifier and then stirs for 2 hours. To the beaker is then added 100 grams of propylene glycol and further mixed for 5 minutes. Next, to the beaker is added 1.91 grams of octylphenol 3 mole ethoxylate and mixed for 5 minutes. To the beaker is then added 782 grams of ethylene glycol and further mixed for 5 minutes. As shown in Table 3A, the percentage of blend for Example 14 is propylene glycol at 10% by weight and ethylene glycol at 78.2% by weight. Then 0.33 grams of nonylphenol 12 mole ethoxylate is added and incorporated into the 1500 ml beaker and further mixed for 5 minutes. The composition mixture is then adjusted to a pH (neat) value between 7 amd 9 with potassium hydroxide. Examples 15 to 20 are made in a similar manner except the amounts of propylene glycol and ethylene glycol used are consistent with the percentages shown for each example. As shown in Tables 3A and 3B, the percentage of blend for Example 15 is propylene glycol at 20.0% by weight and ethylene glycol at 68.2% by weight; blend for Example 16 is propylene glycol at 44.1% by weight and ethylene glycol at 44.1% by weight; blend for Example 17 is propylene glycol at 68.2% by weight and ethylene glycol at 20.0% by weight; blend for Example 18 is propylene glycol at 78.2% by weight and ethylene glycol at 10.0% by weight; blend for Example 19 is propylene glycol at 1.0% by weight and ethylene glycol at 87.2% by weight; and blend for Example 20 is propylene glycol at 87.2% by weight and ethylene glycol at 1.0% by weight.

TABLE 1A

| COMPONENT COMPOSITION | Example 1 | Example 2 | Example 3 | Example 4 |
|---|---|---|---|---|
| | % COMPONENT WEIGHT | | | |
| Propylene Glycol | 88.20 | 61.74 | 57.33 | 52.92 |
| Water | 11.17 | qs to 100 | qs to 100 | qs to 100 |
| First nonionic | 0.191 | 0.134 | 0.124 | 0.115 |
| Second nonionic | 0.033 | 0.023 | 0.021 | 0.020 |
| Polycarboxylate | 0.202 | 0.141 | 0.131 | 0.121 |
| Dilution Ratio | 100/0 | 70/30 | 65/35 | 60/40 |
| Potassium Hydroxide | * | * | * | * |
| WSET (in minutes) | | 22 | 26 | 32 |

*Potassium hydroxide is added "as needed" to adjust the pH to a value between 7 and 9.

TABLE 1B

| COMPONENT COMPOSITION | Example 5 | Example 6 | Example 7 | Example 8 | Example 9 |
|---|---|---|---|---|---|
| | % COMPONENT WEIGHT | | | | |
| Propylene Glycol | 48.51 | 44.1 | 39.69 | 35.28 | 30.87 |
| Water | qs to 100 | qs to 100 | qs to 100 | qs to 100 | qs to 100 |
| First nonionic | 0.105 | 0.096 | 0.086 | 0.076 | 0.067 |

TABLE 1B-continued

| COMPONENT COMPOSITION | Example 5 | Example 6 | Example 7 | Example 8 | Example 9 |
|---|---|---|---|---|---|
| | % COMPONENT WEIGHT | | | | |
| Second nonionic | 0.018 | 0.017 | 0.015 | 0.013 | 0.012 |
| Polycarboxylate | 0.111 | 0.101 | 0.091 | 0.081 | 0.071 |
| Dilution Ratio | 55/45 | 50/50 | 45/55 | 40/60 | 35/65 |
| Potassium Hydroxide | * | * | * | * | * |
| WSET (in minutes) | 45 | 40 | 38 | 31 | 15 |

*Potassium hydroxide is added "as needed" to adjust the pH to a value between 7 and 9.

TABLE 2

| COMPONENT COMPOSITION | Example 10 | Example 11 | Example 12 | Example 13 |
|---|---|---|---|---|
| | % COMPONENT WEIGHT | | | |
| Ethylene Glycol | 88.2 | 61.74 | 48.51 | 30.87 |
| Water | 11.17 | qs to 100 | qs to 100 | qs to 100 |
| First nonionic | 0.191 | 0.134 | 0.105 | 0.067 |
| Second nonionic | 0.033 | 0.023 | 0.018 | 0.012 |
| Polycarboxylate | 0.202 | 0.141 | 0.111 | 0.071 |
| Dilution Ratio | 100/0 | 70/30 | 55/45 | 35/65 |
| Pine Oil | — | — | — | — |
| Potassium Hydroxide | — | — | — | — |
| WSET (in minutes) | — | 45 | 55 | 15 |

*Potassium hydroxide is added "as needed" to adjust the pH to a value between 7 and 9.

TABLE 3A

| COMPONENT COMPOSITION | Example 14 | Example 15 | Example 16 | Example 17 |
|---|---|---|---|---|
| | % COMPONENT WEIGHT | | | |
| Propylene Glycol | 10.0 | 20.0 | 44.1 | 68.2 |
| Ethylene Glycol | 78.2 | 68.2 | 44.1 | 20.0 |
| Water | 11.17 | 11.17 | 11.17 | 11.17 |
| First nonionic | 0.191 | 0.191 | 0.191 | 0.191 |
| Second nonionic | 0.033 | 0.033 | 0.033 | 0.033 |
| Polycarboxylate | 0.202 | 0.202 | 0.202 | 0.202 |
| Potassium Hydroxide | * | * | * | * |

*Potassium hydroxide is added "as needed" to adjust the pH to a value between 7 and 9.

TABLE 3B

| COMPONENT COMPOSITION | Example 18 | Example 19 | Example 20 |
|---|---|---|---|
| | % COMPONENT WEIGHT | | |
| Propylene Glycol | 78.2 | 1.0 | 87.2 |
| Ethylene Glycol | 10.0 | 87.2 | 1.0 |
| Water | 11.17 | 11.17 | 11.17 |
| First nonionic | 0.191 | 0.191 | 0.191 |
| Second nonionic | 0.033 | 0.033 | 0.033 |
| Polycarboxylate | 0.202 | 0.202 | 0.202 |
| Potassium Hydroxide | * | * | * |

*Potassium hydroxide is added "as needed" to adjust the pH to a value between 7 and 9.

As shown in Tables 1A and 1B, example 1 illustrates the present invention using propylene glycol. This is a concentrate which must be diluted with water prior to use. Examples 2 through 9 show these dilutions and the corresponding WSET. A 60/40 dilution through a 40/60 dilution has a WSET greater than 30 minutes, conforming with Type II requirements. The remaining dilutions have WSET's greater than 3 minutes, conforming with Type I requirements.

As shown in Table 2, example 10 illustrates the present invention using ethylene glycol. This is a concentrate which must be diluted with water prior to use. Examples 11 through 13 show these dilutions and the corresponding WSET. The 70/30 and 55/45 dilutions have WSET's greater than 30 minutes, conforming with the Type II requirement, and the 35/65 dilution has a WSET of 15 minutes, conforming with the Type I requirement.

As shown in Tables 3A and 3B, examples 14 through 20 illustrate the present invention using various blends of propylene and ethylene glycol. Without reproducing voluminous data, dilutions of these examples gave WSET's consistent with the type and quantity of glycols present.

Thus, consistent with copending patent application Ser. No. 08/837,999, now U.S. Pat. No. 5,817,252, the three surfactants, glycol and water can be blended as in the examples to produce mixtures having WSET's in the range of type I or type II deicing/anti-icing fluids.

Type I fluids are generally used hot (180–185° F.) to deice aircraft surfaces. They are sprayed at 60–160 psi pressure and upon impinging on an aircraft surface, foam is generated. As clearly shown in copending patent application Ser. No. 08/837,999, now U.S. Pat. No. 5,817,252, mixtures using the present invention have relatively low viscosities as compared to the prior art. Thus, the foam bubbles can quickly rise to the surface and dissipate leaving a smooth unblemished surface. In practice, conventional defoamers can be added to assist foam dissipation.

The second nonionic surfactant (HLB of 5 to 18) has a dual function. Its alternate function is that it controls and causes the viscosity of a dilution of the present invention to start to increase at a warmer temperature. A viscometer with a temperature probe is connected to a computer having a program that can plot viscosity versus temperature. The sample is set in a bath maintained at −40 to −45° C. The printer can make a hard copy of the plot of the viscosity change as the sample cools.

Figure 2:
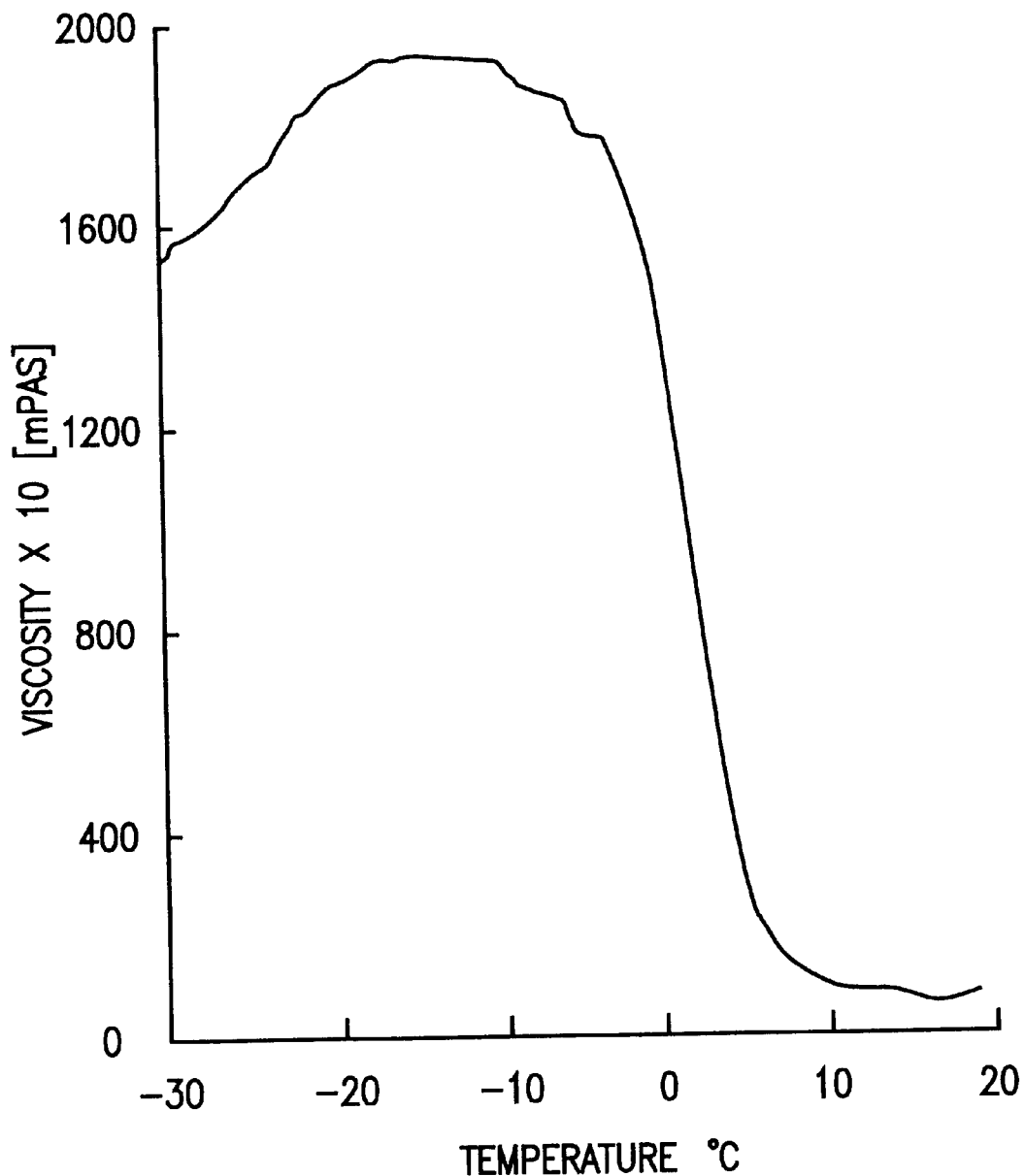
FIG. 2 is a graph showing viscosity versus temperature for the diluted deicer and anti-icer composition having 0.008% content of the second nonionic surfactant therein.
Figure 3:
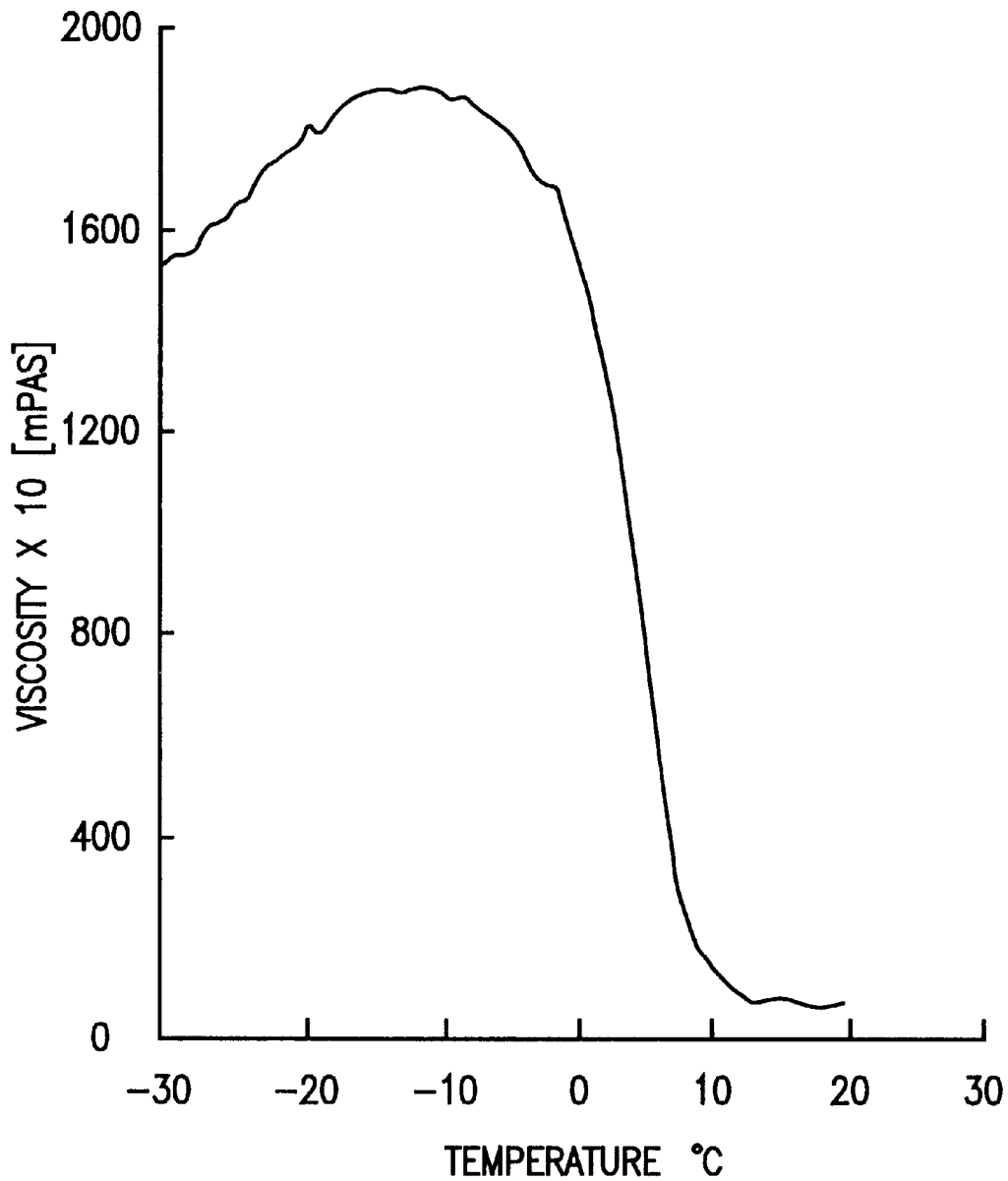
FIG. 3 is a graph showing viscosity versus temperature for the diluted deicer and anti-icer composition having 0.012% content of the second nonionic surfactant therein.
Figure 4:
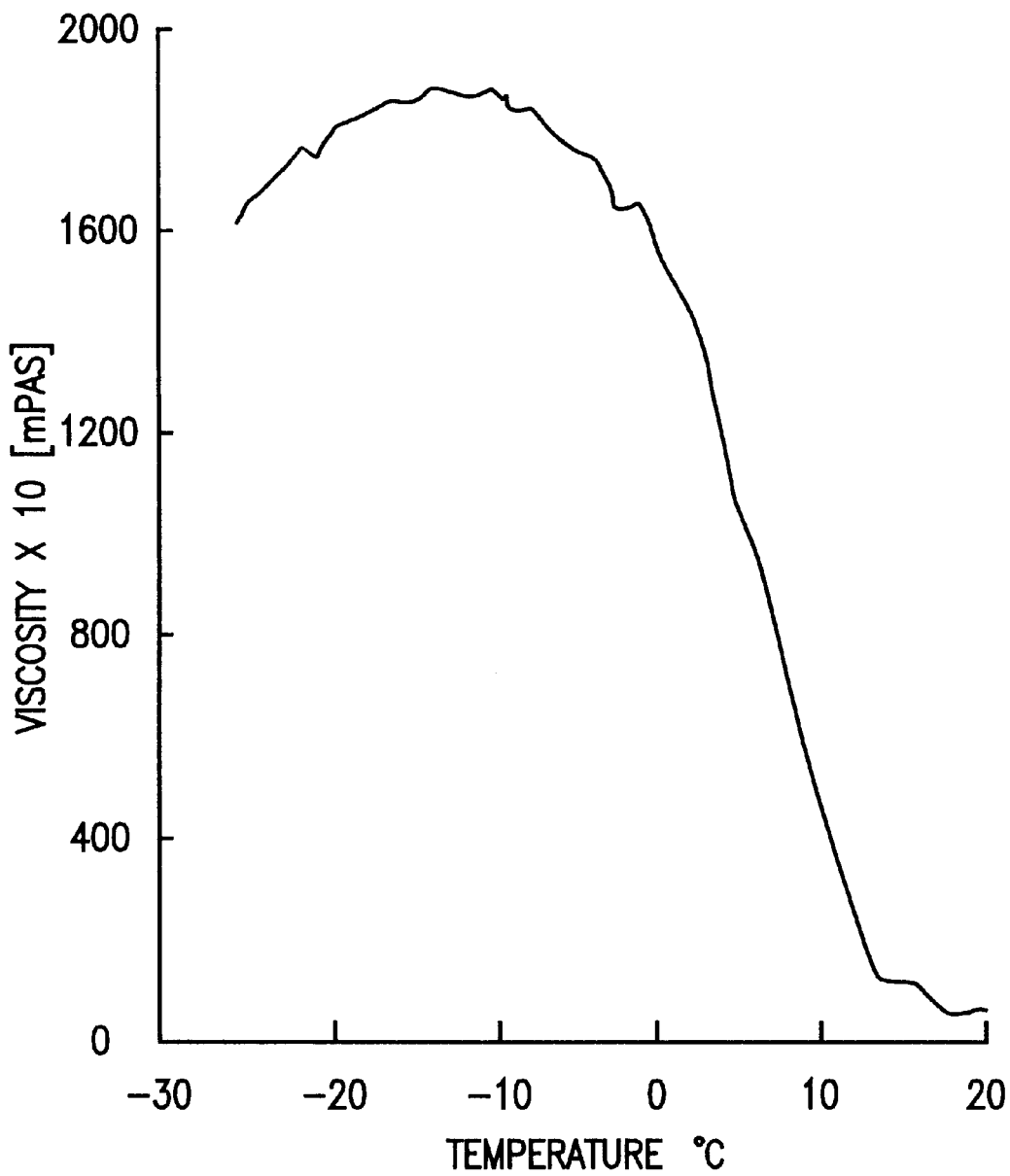
FIG. 4 is a graph showing viscosity versus temperature for the diluted deicer and anti-icer composition having 0.018% content of the second nonionic surfactant therein.

As shown in Table 4, Examples A through D, as depicted in FIGS. 1 through 4, respectively, represent a 55/45 dilution of the present invention with variations in the content of the second nonionic surfactant. However, the chill profiles of these examples are different. Although all four graphs of Examples A through D show a maximum viscosity of 18,000 to 19,000 cps at about −15° C. and drop to 16,000 to 17,000 cps at about −25° C., the viscosities at 0° C. and +10° C. varied markedly. As the amount of the second nonionic is increased, the shape of the curve changes showing higher viscosities at warmer temperatures.

TABLE 4

| COMPONENT COMPOSITION | Example A | Example B | Example C | Example D |
|---|---|---|---|---|
| | % COMPONENT WEIGHT | | | |
| Propylene Glycol | 48.51 | 48.51 | 48.51 | 48.51 |
| Water | 51.155 | 51.147 | 51.143 | 51.137 |
| First nonionic | 0.165 | 0.165 | 0.165 | 0.165 |
| Second nonionic | 0.000 | 0.008 | 0.012 | 0.018 |
| Polycarboxylate | 0.111 | 0.111 | 0.111 | 0.111 |
| Potassium Hydroxide | 0.059 | 0.059 | 0.059 | 0.059 |

ADVANTAGES OF THE PRESENT INVENTION

Accordingly, an advantage of the present invention is that it provides for an improved deicing/anti-icing fluid composition which when diluted has a WSET time interval of not less than 30 minutes when applied using conventional Type I and Type II deicing/anti-icing vehicles. This same dilution can be used hot as an deicing fluid in Type I vehicles. Thus, an airport having storage for one fluid can have both Type I and Type II capabilities.

Another advantage of the present invention is that it provides for a chemical composition having a distinct chemical mechanism for retarding the onset of re-freezing of water on the surface of the protective film of anti-icing fluid when applied to aircraft surfaces.

Another advantage of the present invention is that it provides for a fluid composition which does not rely upon increased thickness and volume of fluid to achieve its objective.

Another advantage of the present invention is that it provides for an improved deicing and anti-icing concentrate fluid composition that may be diluted with water and continue to retain a prolonged holdover of at least 30 minutes.

A further advantage of the present invention is the ease of application and the ability of the fluid composition to flow and level over the treated surface, eliminating the need to apply second or third coatings to ensure overall coverage, which can be the case for fluids of the prior art which rely on high viscosity and volume thickness to ensure adequate performance.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A deicing and anti-icing concentrate composition being a mixture for applying to aircraft surfaces after dilution, comprising:
   a) a base compound being propylene glycol in the range of 78.0% to 95.0% by weight of said deicing and anti-icing concentrate composition;
   b) a diluent in the form of water for use as a carrier fluid of said propylene glycol in the range of 5.0% to 22.0% by weight of said deicing and anti-icing concentrate composition;
   c) a first nonionic surfactant agent having an HLB in the range of 4 to 17 and wherein said first surfactant agent is between 1 ppm to 0.5% by weight of said deicing and anti-icing concentrate composition;
   d) a second nonionic surfactant agent having an HLB in the range of 5 to 18 and wherein said second surfactant agent is between 1 ppm to 0.5% by weight of said deicing and anti-icing concentrate composition; said second nonionic surfactant agent having an HLB at least two (2) units higher than said first nonionic surfactant agent;
   e) an emulsifier in the form of a polycarboxylate compound present in the range of 1 ppm to 0.5% by weight of said deicing and anti-icing concentrate composition; and
   f) a pH control agent for maintaining the pH of said deicing and anti-icing concentrate composition between a value of 6 and 10; wherein said pH control agent is in the range between 1 ppm to 1.0% by weight of said deicing and anti-icing concentrate composition.

2. A deicing and anti-icing concentrate composition in accordance with claim 1:
   a) wherein said base compound is in the range of 88.0% to 85.5% by weight of said deicing and anti-icing concentrate composition;
   b) wherein said diluent is in the range of 10.0% to 12.0% by weight of said deicing and anti-icing concentrate composition;
   c) wherein said first nonionic surfactant agent has an HLB in the range of 4 to 9 and is between 1 ppm to 0.5% by weight of said deicing and anti-icing concentrate composition;
   d) wherein said second nonionic surfactant agent has an HLB in the range of 13 to 18 and is between 1 ppm to 0.5% by weight of said deicing and anti-icing concentrate composition; and
   e) said emulsifier present in the range of 1 ppm to 0.5% by weight of said deicing and anti-icing concentrate composition.

3. A deicing and anti-icing concentrate composition in accordance with claim 1, wherein said first and second nonionic surfactant agents are selected from the group having radicals consisting of alcohols, alkylphenols, amines, fatty acids, and propylene oxide block polymers.

4. A deicing and anti-icing concentrate composition in accordance with claim 1, wherein said polycarboxylate compound has a molecular weight between one-half million ($5 \times 10^5$) to three million ($3 \times 10^6$).

5. A deicing and anti-icing concentrate composition in accordance with claim 1, wherein said pH control agent is selected from the group consisting of potassium hydroxide, sodium hydroxide, organic amine bases, tolytriazole and benzotriazole.

6. A deicing and anti-icing concentrate composition in accordance with claim 1, wherein said deicing and anti-icing concentrate composition has a pH value of greater than 7 so as to be alkaline.

7. A deicing and anti-icing concentrate composition in accordance with claim 6, wherein said deicing and anti-icing concentrate composition has a pH value in the range of between 7.01 to 10.00 so as to be alkaline.

8. A deicing and anti-icing concentrate composition in accordance with claim 1, wherein said deicing and anti-icing concentrate composition has a pH value of less than 7 so as to be acidic.

9. A deicing and anti-icing concentrate composition in accordance with claim 8, wherein said deicing and anti-icing concentrate composition has a pH value in the range of between 6.00 to 6.99 so as to be acidic.

10. A deicing and anti-icing concentrate composition in accordance with claim 1, further including an anti-corrosion compound to control the oxidative layer of said aircraft surfaces; wherein said anti-corrosion compound is in the range between 1 ppm to 1.0% by weight of said deicing and anti-icing concentrate composition.

11. A deicing and anti-icing concentrate composition in accordance with claim 10, wherein said anti-corrosion compound is selected from the group consisting of a tolytriazole, a benzotriazole, an alkoxylated butynediol, a thiourea, a propargyl alcohol, a sodium nitrate, and a butyne-1,4 diol, and combinations thereof.

12. A deicing and anti-icing concentrate composition in accordance with claim 1, further including an anti-foam agent in the form of a silicone oil-based defoamer for preventing foaming of said deicing and anti-icing composition; wherein said anti-foam agent is in the range between 1 ppm to 0.5% by weight of said deicing and anti-icing concentrate composition.

13. A deicing and anti-icing concentrate composition in accordance with claim 1, further including a non-flammability agent wherein said non-flammability agent is in the range between 1 ppm to 1.0% by weight of said deicing and anti-icing concentrate composition.

14. A deicing and anti-icing concentrate composition in accordance with claim 13, wherein said non-flammability agent is selected from the group consisting of tolytriazole and benzotriazole.

15. A deicing and anti-icing concentrate composition in accordance with claim 1, further including a water hardness control agent for the softening of said diluent water within said deicing and anti-icing concentrate composition; wherein said water hardness control agent is in the range between 1 ppm to 1.0% by weight of said deicing and anti-icing concentrate composition.

16. A deicing and anti-icing composition in accordance with claim 15, wherein said water hardness control agent is selected from the group consisting of a sodium ethylenediaminetetraacetate, a sodium hydroxyethylethylenediaminetriacetate, a tolytriazole, a benzotriazole, a sodium polyphosphate, a sodium nitrilotriacetate, a sodium pyrophosphate, a sodium citrate and a sodium gluconate.

17. A deicing and anti-icing concentrate composition in accordance with claim 1, further including a color dye identification component in the form of a water-soluble dye for indicating that said deicing and anti-icing concentrate composition has been applied to said aircraft surfaces; wherein said color dye identification component is in the range between 10 ppb to 0.1% by weight of said deicing and anti-icing concentrate composition.

18. A deicing and anti-icing concentrate composition in accordance with claim 17, wherein said water-soluble dye is selected from the group consisting of a red-orange dye, a colorless to straw color dye and a green dye.

19. A deicing and anti-icing concentrate composition being a mixture for applying to aircraft surfaces after dilution, comprising:
   a) a base compound being ethylene glycol in the range of 78.0% to 95.0% by weight of said deicing and anti-icing composition;
   b) a diluent in the form of water for use as a carrier fluid of said ethylene glycol in the range of 5.0% to 22.0% by weight of said deicing and anti-icing concentrate composition;
   c) a first nonionic surfactant agent having an HLB in the range of 4 to 17 and wherein said first surfactant agent is between 1 ppm to 0.5% by weight of said deicing and anti-icing concentrate composition;
   d) a second nonionic surfactant agent having an HLB in the range of 5 to 18 and wherein said second surfactant agent is between 1 ppm to 0.5% by weight of said deicing and anti-icing concentrate composition; said second nonionic surfactant agent having an HLB at least two (2) units higher than said first nonionic surfactant agent;
   e) an emulsifier in the form of a polycarboxylate compound present in the range of 1 ppm to 0.5% by weight of said deicing and anti-icing concentrate composition; and
   f) a pH control agent for maintaining the pH of said deicing and anti-icing concentrate composition between a value of 6 and 10; wherein said pH control agent is in the range between 1 ppm to 1.0% by weight of said deicing and anti-icing concentrate composition.

20. A deicing and anti-icing concentrate composition in accordance with claim 19:
   a) wherein said base compound is in the range of 88.0% to 88.5% by weight of said deicing and anti-icing concentrate composition;
   b) wherein said diluent is in the range of 10.0% to 12.0% by weight of said deicing and anti-icing concentrate composition;
   c) wherein said first nonionic surfactant agent has an HLB in the range of 4 to 9 and is between 1 ppm to 0.5% by weight of said deicing and anti-icing concentrate composition;
   d) wherein said second nonionic surfactant agent has an HLB in the range of 13 to 18 and is between 1 ppm to 0.5% by weight of said deicing and anti-icing concentrate composition; and
   e) said emulsifier present in the range of 1 ppm to 0.5% by weight of said deicing and anti-icing concentrate composition.

21. A deicing and anti-icing concentrate composition in accordance with claim 19, wherein said first and second nonionic surfactant agents are selected from the group having radicals consisting of alcohols, alkylphenols, amines, fatty acids, propylene oxide block polymers and ethylene oxide block polymers.

22. A deicing and anti-icing concentrate composition in accordance with claim 19, wherein said polycarboxylate compound has a molecular weight between one-half million ($5 \times 10^5$) to three million ($3 \times 10^6$).

23. A deicing and anti-icing concentrate composition in accordance with claim 19, wherein said pH control agent is selected from the group consisting of potassium hydroxide, sodium hydroxide, dipotassium phosphate, organic amine bases, tolytriazole and benzotriazole.

24. A deicing and anti-icing concentrate composition in accordance with claim 19, wherein said deicing and anti-icing concentrate composition has a pH value of greater than 7 so as to be alkaline.

25. A deicing and anti-icing concentrate composition in accordance with claim 24, wherein said deicing and anti-icing concentrate composition has a pH value in the range of between 7.01 to 10.00 so as to be alkaline.

26. A deicing and anti-icing concentrate composition in accordance with claim 19, wherein said deicing and anti-icing concentrate composition has a pH value of less than 7 so as to be acidic.

27. A deicing and anti-icing concentrate composition in accordance with claim 26, wherein said deicing and anti-icing concentrate composition has a pH value in the range of between 6.00 to 6.99 so as to be acidic.

28. A deicing and anti-icing concentrate composition in accordance with claim 19, further including an anti-corrosion compound to control the oxidative layer of said aircraft surfaces; wherein said anti-corrosion compound is in the range between 1 ppm to 1.0% by weight of said deicing and anti-icing concentrate composition.

29. A deicing and anti-icing concentrate composition in accordance with claim 28, wherein said anti-corrosion compound is selected from the group consisting of a tolytriazole, a benzotriazole, an alkoxylated butynediol, a thiourea, a propargyl alcohol, a sodium nitrate, and a butyne-1,4 diol and combinations thereof.

30. A deicing and anti-icing concentrate composition in accordance with claim 19, further including an anti-foam agent in the form of a silicone oil-based defoamer for preventing foaming of said deicing and anti-icing composition; wherein said anti-foam agent is in the range between 1 ppm to 0.5% by weight of said deicing and anti-icing concentrate composition.

31. A deicing and anti-icing concentrate composition in accordance with claim 19, further including a non-flammability agent; wherein said non-flammability agent is in the range between 1 ppm to 1.0% by weight of said deicing and anti-icing concentrate composition.

32. A deicing and anti-icing concentrate composition in accordance with claim 31, wherein said non-flammability agent is selected from the group consisting of tolytriazole and benzotriazole.

33. A deicing and anti-icing concentrate composition in accordance with claim 19, further including a water hardness control agent for the softening of said diluent water within said deicing and anti-icing concentrate composition; wherein said water hardness control agent is in the range between 1 ppm to 1.0% by weight of said deicing and anti-icing concentrate composition.

34. A deicing and anti-icing concentrate composition in accordance with claim 33, wherein said water hardness control agent is selected from the group consisting of a sodium ethylenediaminetetraacetate, a sodium hydroxyethylethylenediaminetriacetate, a tolytriazole, a benzotriazole, a sodium polyphosphate, a sodium nitrilotriacetate, a sodium pyrophosphate, a sodium gluconate and a sodium citrate.

35. A deicing and anti-icing concentrate composition in accordance with claim 19, further including a color dye identification component in the form of a water-soluble dye for indicating that said deicing and anti-icing composition has been applied to said aircraft surfaces; wherein said color dye identification component is in the range between 10 ppb to 0.1% by weight of said deicing and anti-icing concentrate composition.

36. A deicing and anti-icing concentrate composition in accordance with claim 35, wherein said water-soluble dye is selected from the group consisting of a red-orange dye, a colorless to straw color dye and a green dye.

37. A deicing and anti-icing concentrate composition being a mixture for applying to aircraft surfaces after dilution, comprising:
a) a combination of base compounds being propylene glycol and ethylene glycol in the range of 78.0% to 95.0% by weight of said deicing and anti-icing composition, wherein said propylene glycol base compound does not exceed 87.2% by weight of said deicing and anti-icing concentrate composition and said ethylene glycol base compound does not exceed 87.2% by weight of said deicing and anti-icing concentrate composition;
b) a diluent in the form of water for use as a carrier fluid for said combination of ethylene glycol and propylene glycol being in the range of 5.0% to 22.0% by weight of said deicing and anti-icing concentrate composition;
c) a first nonionic surfactant agent having an HLB in the range of 4 to 17 and wherein said first surfactant agent is between 1 ppm to 0.5% by weight of said deicing and anti-icing concentrate composition;
d) a second nonionic surfactant agent having an HLB in the range of 5 to 18 and wherein said second surfactant agent is between 1 ppm to 0.5% by weight of said deicing and anti-icing composition; said second nonionic surfactant agent having an HLB at least two (2) units higher than said first nonionic surfactant agent;
e) an emulsifier in the form of a polycarboxylate compound present in the range of 1 ppm to 0.5% by weight of said deicing and anti-icing concentrate composition; and
f) a pH control agent for maintaining the pH of said deicing and anti-icing concentrate composition between a value of 6 and 10; wherein said pH control agent is in the range between 1 ppm to 1.0% by weight of said deicing and anti-icing concentrate composition.

38. A deicing and anti-icing concentrate composition in accordance with claim 37:
a) wherein said base compounds are in the range of 88.0% to 88.5% by weight of said deicing and anti-icing concentrate composition;
b) wherein said diluent is in the range of 10.0% to 12.0% by weight of said deicing and anti-icing concentrate composition;
c) wherein said first nonionic surfactant agent has an HLB in the range of 4 to 9 and is between 1 ppm to 0.5% by weight of said deicing and anti-icing concentrate composition;
d) wherein said second nonionic surfactant agent has an HLB in the range of 13 to 18 and is between 1 ppm to 0.5% by weight of said deicing and anti-icing concentrate composition; and
e) said emulsifier present in the range of 1 ppm to 0.5% by weight of said deicing and anti-icing concentrate composition.

39. A deicing and anti-icing concentrate composition in accordance with claim 37, wherein said first and second nonionic surfactant agents are selected from the group having radicals consisting of alcohols, alkylphenols, amines, fatty acids, propylene oxide block polymers, and ethylene oxide block polymers.

40. A deicing and anti-icing concentrate composition in accordance with claim 37, wherein said polycarboxylate compound has a molecular weight between one-half million ($5 \times 10^5$) to three million ($3 \times 10^6$).

41. A deicing and anti-icing concentrate composition in accordance with claim 37, wherein said pH control agent is selected from the group consisting of potassium hydroxide, sodium hydroxide, organic amine bases, tolytriazole, and benzotriazole.

42. A deicing and anti-icing concentrate composition in accordance with claim 37, wherein said deicing and anti-icing concentrate composition has a pH value of greater than 7 so as to be alkaline.

43. A deicing and anti-icing concentrate composition in accordance with claim 42, wherein said deicing and anti-icing concentrate composition has a pH value in the range of between 7.01 to 10.00 so as to be alkaline.

44. A deicing and anti-icing concentrate composition in accordance with claim 37, wherein said deicing and anti-icing concentrate composition has a pH value of less than 7 so as to be acidic.

45. A deicing and anti-icing concentrate composition in accordance with claim 44, wherein said deicing and anti-icing concentrate composition has a pH value in the range of between 6.00 to 6.99 so as to be acidic.

46. A deicing and anti-icing concentrate composition in accordance with claim 37, further including an anti-corrosion compound to control the oxidative layer of said aircraft surfaces; wherein said anti-corrosion compound is in the range between 1 ppm to 1.0% by weight of said deicing and anti-icing concentrate composition.

47. A deicing and anti-icing concentrate composition in accordance with claim 46, wherein said anti-corrosion compound is selected from the group consisting of a tolytriazole, a benzotriazole, an alkoxylated butynediol, a thiourea, a propargyl alcohol, a sodium nitrate, and a butyne-1,4 diol, and combinations thereof.

48. A deicing and anti-icing concentrate composition in accordance with claim 37, further including an anti-foam agent in the form of a silicone oil-based defoamer for preventing foaming of said deicing and anti-icing concentrate composition; wherein said anti-foam agent is in the range between 1 ppm to 0.5% by weight of said deicing and anti-icing concentrate composition.

49. A deicing and anti-icing concentrate composition in accordance with claim 37, further including a non-flammability agent wherein said non-flammability agent is in the range between 1 ppm to 1.0% by weight of said deicing and anti-icing concentrate composition.

50. A deicing and anti-icing concentrate composition in accordance with claim 49, wherein said non-flammability agent is selected from the group consisting of tolytriazole and benzotriazole.

51. A deicing and anti-icing concentrate composition in accordance with claim 37, further including a water hardness control agent for the softening of said diluent water within said deicing and anti-icing composition; wherein said water hardness control agent is in the range between 1 ppm to 1.0% by weight of said deicing and anti-icing concentrate composition.

52. A deicing and anti-icing concentrate composition in accordance with claim 51, wherein said water hardness control agent is selected from the group consisting of a sodium ethylenediaminetetraacetate, a sodium hydroxyethylethylenediaminetriacetate, a tolytriazole, a benzotriazole, a sodium polyphosphate, a sodium nitrilotriacetate, a sodium pyrophosphate, a sodium citrate and a sodium gluconate.

53. A deicing and anti-icing concentrate composition in accordance with claim 37, further including a color dye identification component in the form of a water-soluble dye for indicating that said deicing and anti-icing composition has been applied to said aircraft surfaces; wherein said color dye identification component is in the range between 10 ppb to 0.1% by weight of said deicing and anti-icing concentrate composition.

54. A deicing and anti-icing concentrate composition in accordance with claim 53, wherein said water-soluble dye is selected from the group consisting of a red-orange, a colorless to straw color dye and a green dye.

55. A deicing and anti-icing concentrate composition comprising a nonionic surfactant agent having a HLB in the range of 5 to 18 and wherein the range is between 1 ppm to 0.5% by weight of said deicing and anti-icing composition and wherein the nonionic surfactant agent functions to alter the viscosity versus temperature profile of said deicing and anti-icing concentrate composition.

\* \* \* \* \*